Patented May 17, 1949

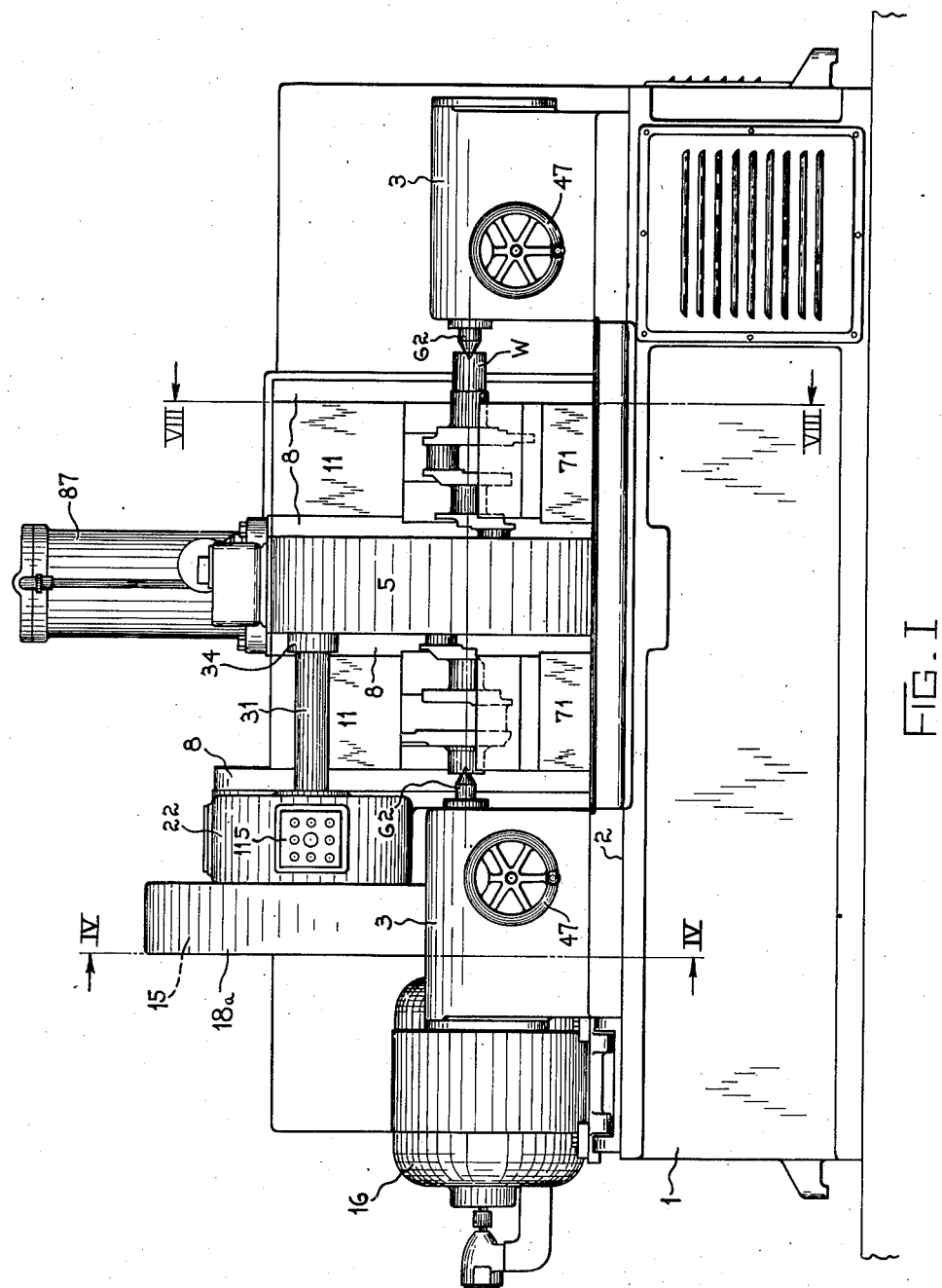

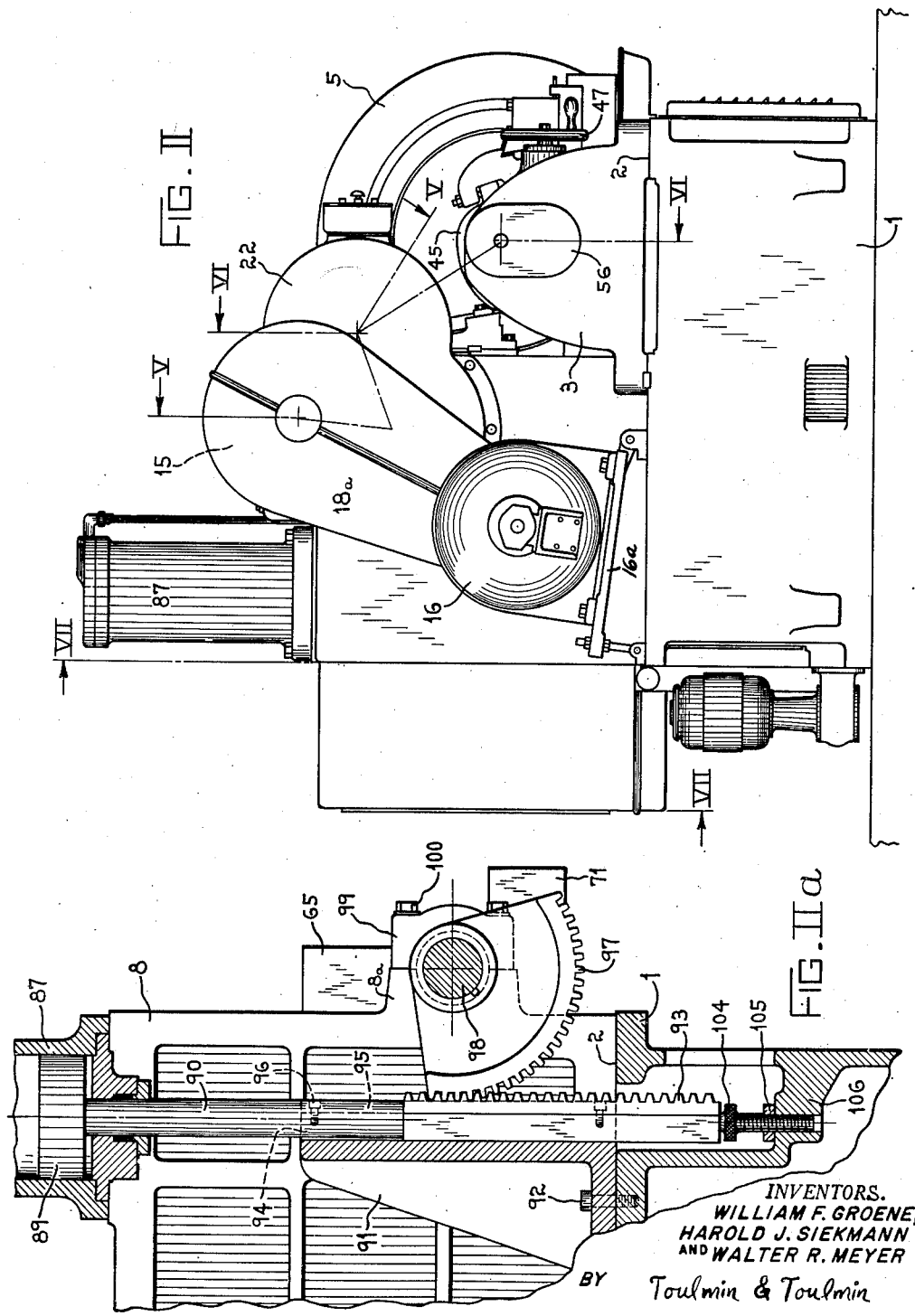

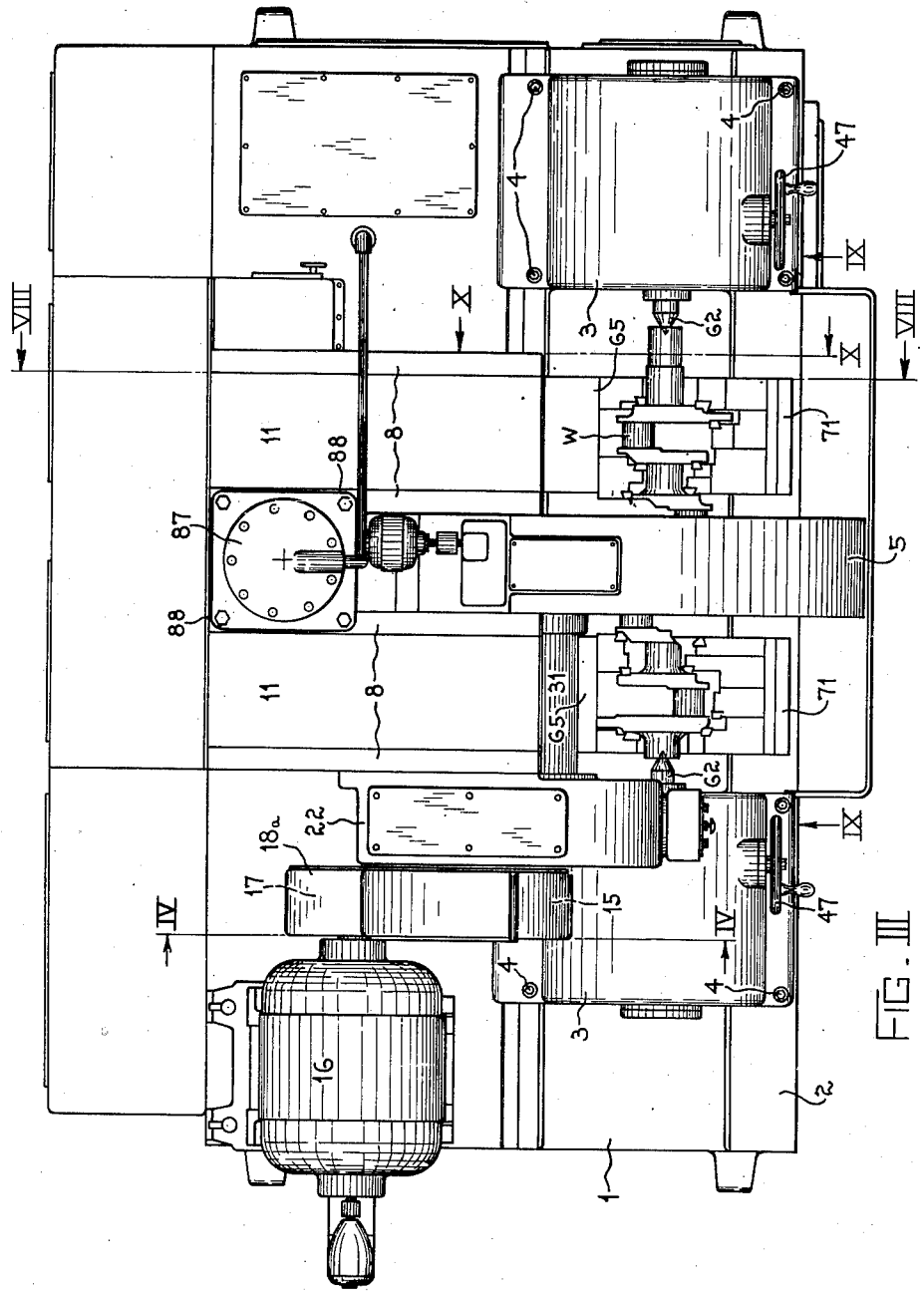

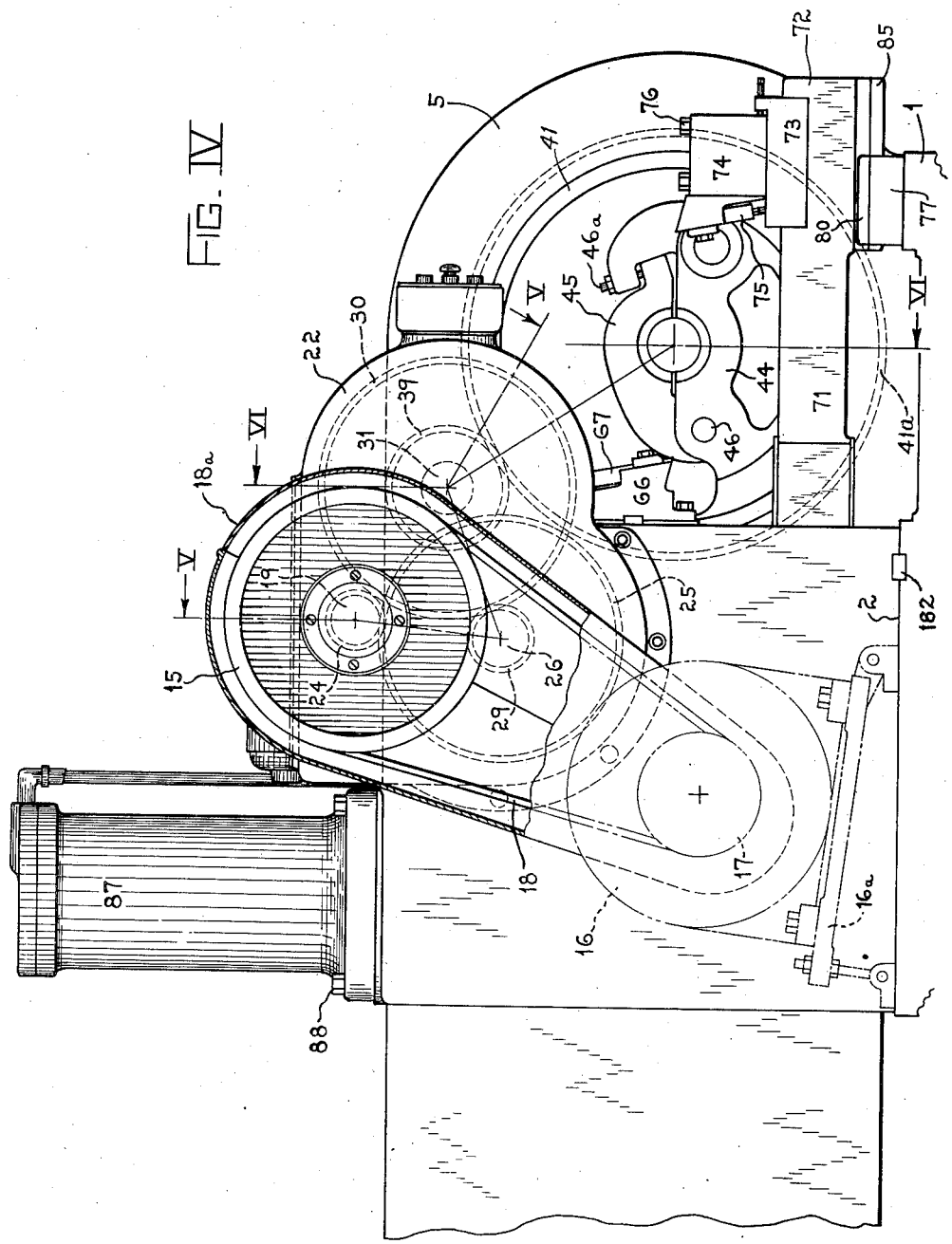

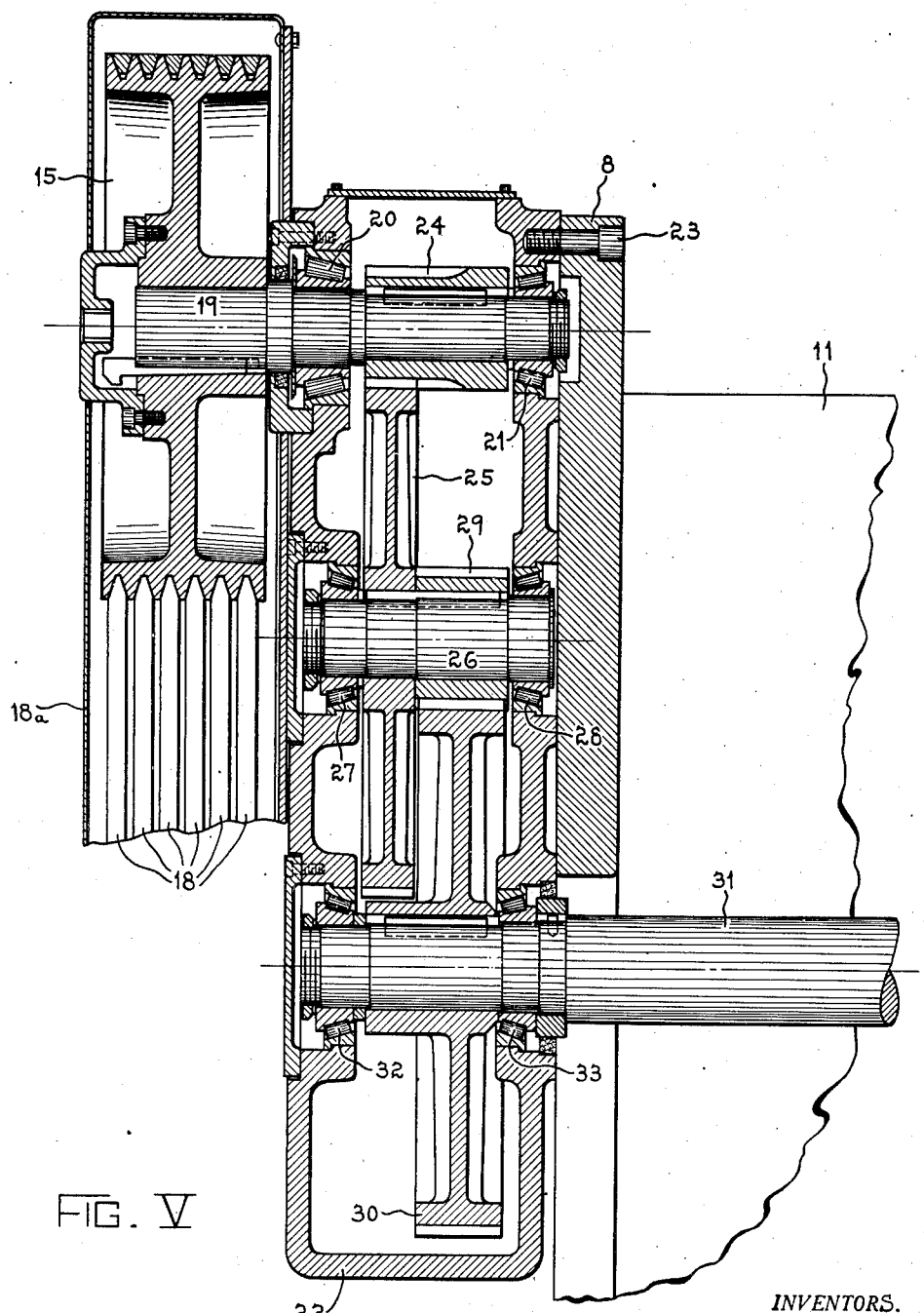

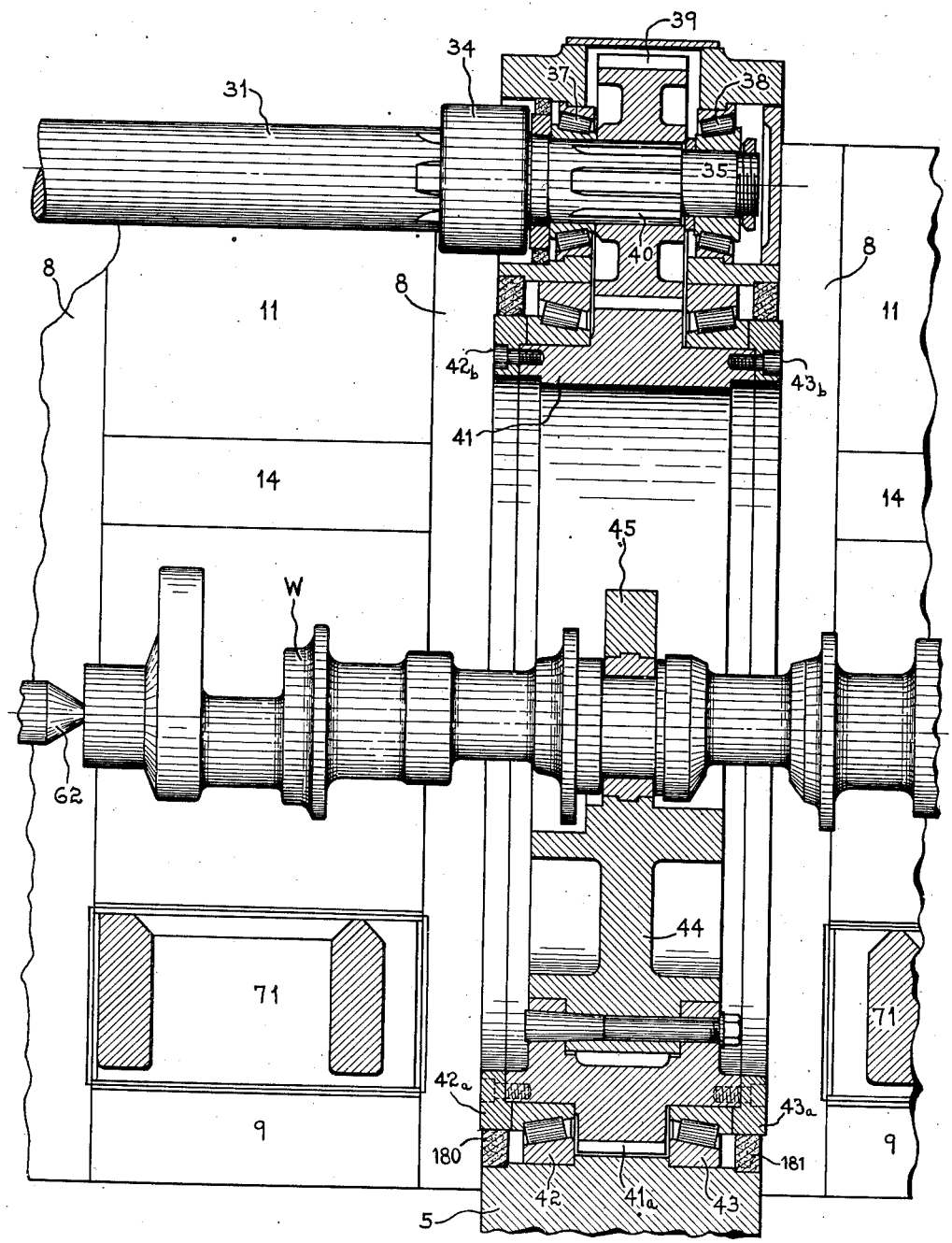
FIG. VI

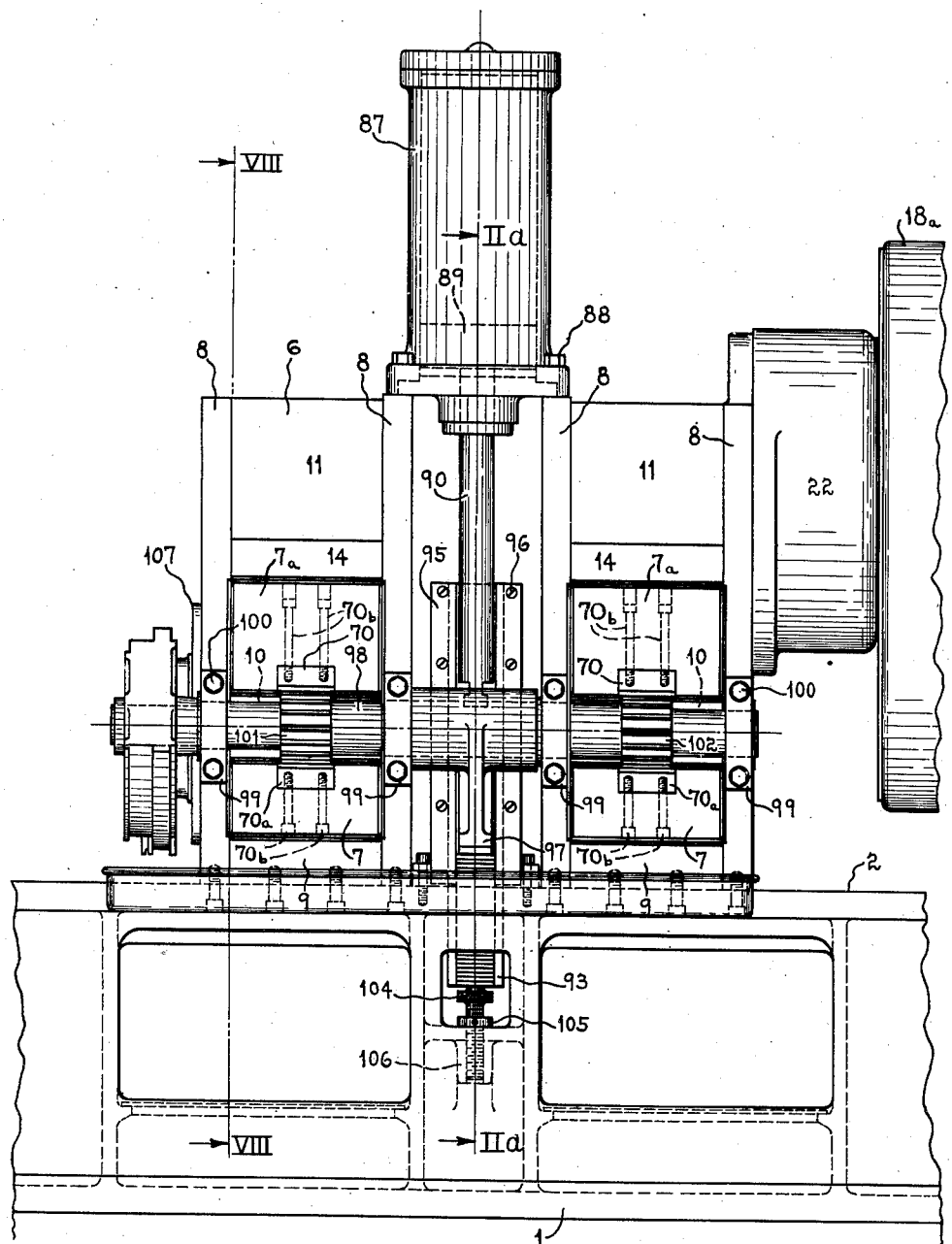
FIG. VII

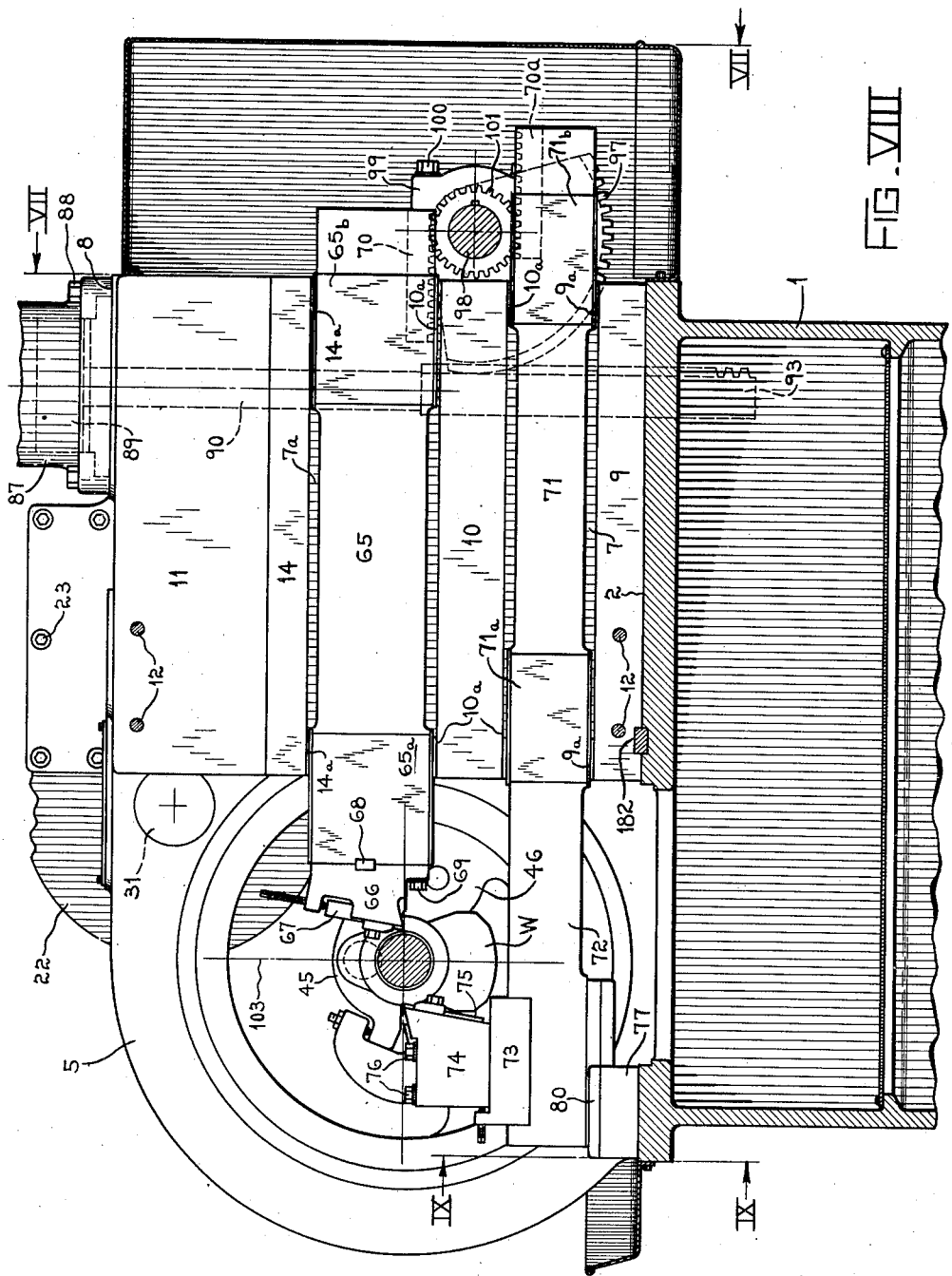
FIG. VII

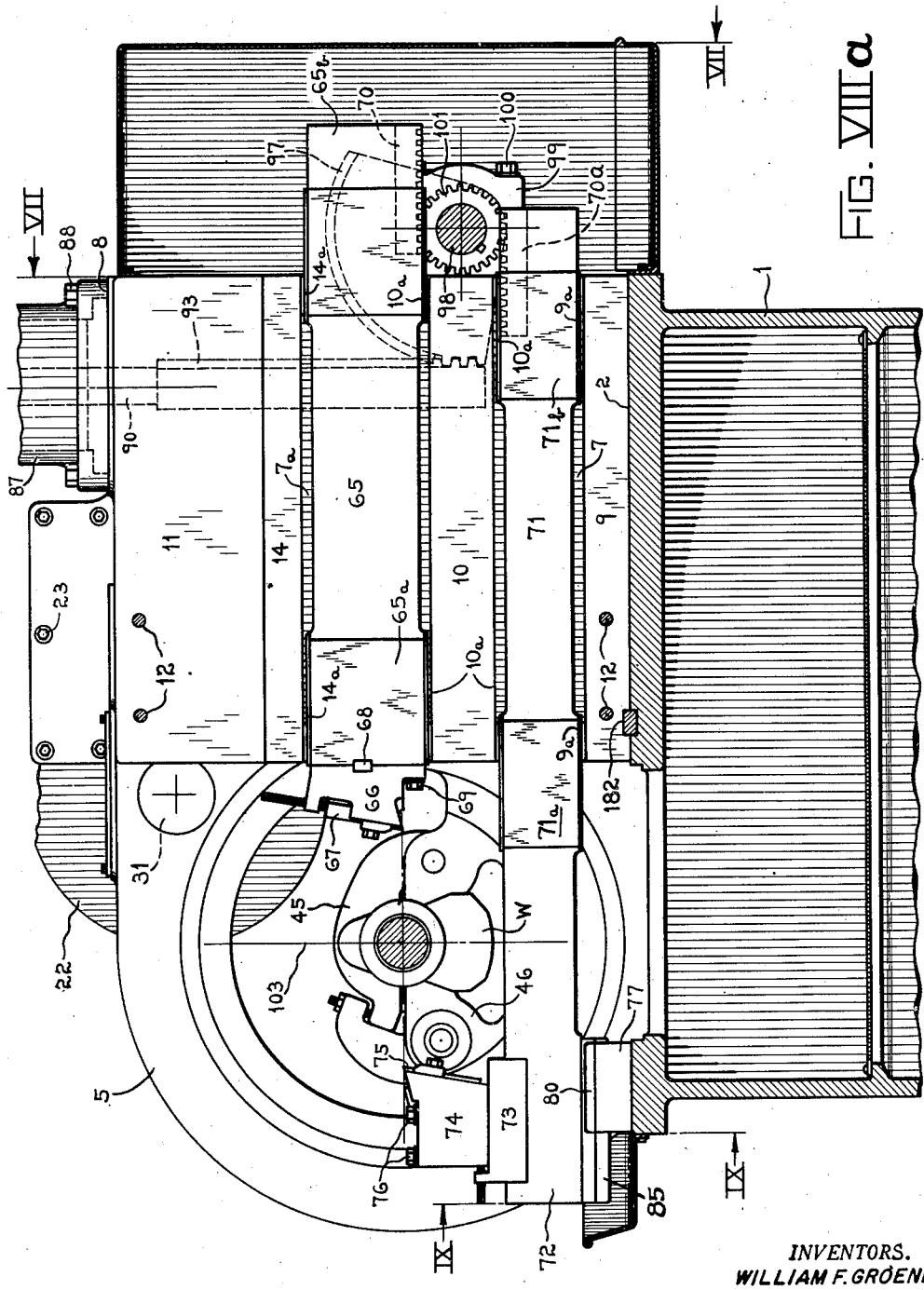

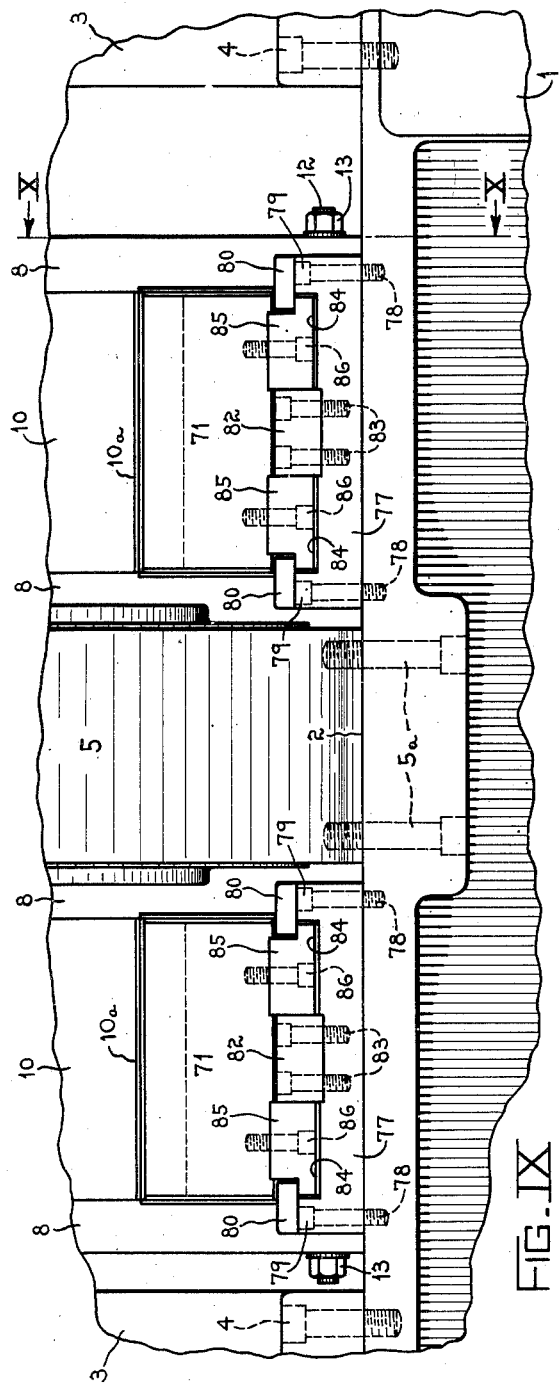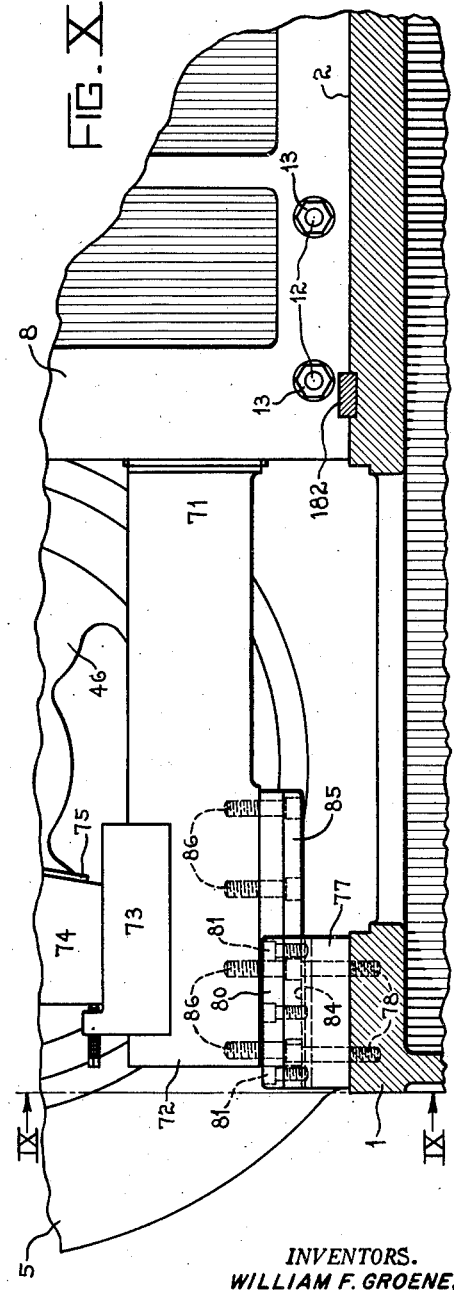

2,470,304

UNITED STATES PATENT OFFICE 2,470,304

CRANKSHAFT LATHE

William F. Groene, Harold J. Siekmann, and Walter R. Meyer, Cincinnati, Ohio, assignors to The R. K. Le Blond Machine Tool Company, Cincinnati, Ohio, a corporation of Delaware Application January 11, 1945, Serial No. 572,388

1 Claim. (Cl. 82—24)

This invention relates to lathes, particularly of the center drive type intended for machining the end portions of shafts or similar work pieces. The machine that we have selected for disclosure of our invention is intended more particularly for simultaneous machining of the stub end, flange end, cheek portions and line bearings of a crankshaft such as are used in internal combustion engines.

It is an object of our invention to provide a machine in which the aforesaid portions of a work piece may be machined at one pass of the cutting tools.

Another object is to provide a method of cutting down a work piece whereby all forces tending to distort the axis of the rotating work piece from the axis of rotation of the machine are annulled, whereby the completed article has a very high degree of precision and accuracy.

Another object is to provide a lathe for carrying out the method described in the immediately foregoing paragraph and having one or more tool units, each unit comprising a pair of tool holders adapted to advance tools thereon into the work in substantially diametrically opposite directions whereby the reactions between the tools and the work piece in a direction transverse to the axis of rotation are substantially equal and opposite and tend to cancel one another.

Another object is to provide means whereby the feeding of a plurality of cutting tools is stopped by a single means, adjustable to vary the finished diameter, whereby variations in size may be effected, while exact duplicate finished work pieces for a given setting are assured.

Another object is to provide a machine having a tool carrier reciprocably mounted at a point substantially in the line of radial reaction between the tool and work, whereby the tools thereon are rigidly supported and free from chattering to thus assure a high degree of smoothness and accuracy in the finished product while at the same time providing rapid and efficient disposal of the chips and coolant during the machining operation.

Other objects and advantages will be explained, or become apparent, as the description proceeds.

In the drawings:

Figure I is a front elevational view of a typical crankshaft lathe for turning all the line bearing portions of a crankshaft and incorporating the features of this invention, Figure II is a left hand end view of the machine and showing in particular the location of the main drive motor, the hydraulic cylinder for actuating the various tool units and the center drive head, Figure IIa is an enlarged fragmentary section shown on the line IIa—IIa of Figure VII, particularly showing the sliding rack and segmental gear arrangement for actuating the tool units, together with the stop screw for positively limiting feeding movements of the tools, Figure III is a plan view of the machine shown in Figures I and II, particularly showing the main drive motor, hydraulic cylinder, the center drive head and the work supporting tailstocks, Figure IV is an enlarged view of the left hand end of the machine shown on the line IV—IV of Figures I and III with the work supporting headstock and the work crankshaft being omitted in order to more clearly show the geared drive from the main drive motor to the work supporting headstock, Figure V is an enlarged longitudinal section shown on the line V—V of Figures II and IV, particularly showing the drive pulley and its associated drive gearing, Figure VI is an enlarged longitudinal section taken on the line VI—VI of Figures II and IV showing the work supporting headstock with a work piece mounted therein, and the driving mechanism therefor, Figure VII is a rear view taken on the line VII—VII of Figures II, VIII, VIIIa and showing the hydraulic cylinder, its associated mechanism for actuating the various tool units, and the stop screw for limiting feeding movement of the tools, Figure VIII is a vertical transverse section through the machine shown on the line VIII—VIII of Figures I, III, and VII, particularly showing the tool units with their associated tools at the end of the cutting cycle and also the rack and pinion mechanism for moving them to and from the work, Figure VIIIa is a vertical transverse section similar to that of Figure VIII but showing the tool units when they are withdrawn from the work and are in the position for loading or unloading the work into or out of the machine.

Figure IX is an enlarged view of the front portion of the machine taken on the line IX—IX of Figures III, VIII, VIIIa, and X, showing in detail the construction of the front guide member for the extending portion of the lower tool unit, Figure X is an enlarged right hand and sectional view of the guide member for one of the lower tool units taken on the line X—X of Figures I, III, and IX.

Referring in detail to the drawing, particularly

Figures I and II, the numeral 1 identifies a base having an upper surface 2 to which are fixed, as by means of bolts 4, a pair of spaced, axially-aligned tailstocks 3. A headstock 5 is secured to surface 2 by means of bolts 5a, Figure IX. Referring to Figure VI, it will be noted that the headstock is in the general form of a ring centrally located between tailstocks 3 and concentric with the work axis of rotation defined by said tailstocks. A ring 41 having gear teeth 41a formed upon the periphery thereof is rotatably mounted within the headstock, by means of bearings 42 and 43. Bearing retainer rings 42a and 43a are secured to ring 41 as by means of bolts 42b and 43b to hold the bearings 42 and 43 in position, and sealing rings 180 and 181 are interposed between the inner periphery of headstock 5 and rings 42a and 43a, respectively, to protect the bearings from dust and chips.

Ring 41 has fixed therewithin, a chuck half 44, Figure IV, to which is pivoted as at 46, a second chuck half 45. The two halves define an opening lying upon the work axis and adapted to receive and grip a suitable portion of the work piece when bolt 46a is turned down.

A driving motor 16, is mounted upon a base 16a pivoted upon the top surface 2 of base 1 and has a pulley 17 driving a pulley 15 by means of a number of V-belts 18. A reduction gear box 22, Figure V, is secured to an upright frame member 8 of the lathe, as by means of bolts 23. A jack shaft 19 is journaled in box 22, by means of bearings 20 and 21 and projects exteriorly of said box. Belt pulley 15 is keyed to the projecting end of shaft 19 while a pinion 24 is keyed thereto within box 22. Pinion 24 meshes with an idler gear 25 fixed to a shaft 26 supported on bearings 27 and 28. Shaft 26 also has fixed thereto a pinion 29 meshing with a gear 30 keyed to drive shaft 31. As shown, shaft 31 is journaled at its end within box 22, upon bearings 32 and 33. As will be noted from Figures IV and V, a belt guard 18a extends about and guards against contact with belts 18.

From Figures IV and VI it will be noted that shaft 31 extends along the lathe and is coupled, as at 34, to a shaft 35 journaled in bearings 37 and 38 within an opening in headstock 5. Shaft 35 has splines 40 receiving a correspondingly shaped hub of a pinion 39 in mesh with the teeth 41a formed upon the periphery of headstock gear 41. In this manner, the work W is gripped in chuck 44, 45 and rotated at the desired speed by motor 16.

The tailstocks 3 each have the usual centers 62 for supporting the end of the work W. A handwheel 47 is provided at the front of each tailstock to axially position the centers in the usual manner for such tailstocks. Handwheels 47 may be turned, to advance the centers 62 into and out of engagement with a corresponding end of the work piece held in chuck 45. In loading, a work piece W, such as a crankshaft, is first chucked within headstock 5 whereupon handwheels 47 are operated to move tailstock centers 62 into centering depressions previously formed in the ends of the work piece.

A number of spaced upright plates or frame members 8 are fixed to base 1, as shown at Figures VII and VIII, to lie in parallel planes normal to the work axis. In the present machine, two pairs of these plates are shown, the pairs lying on opposite sides of the headstock 5. As the guideways formed by each pair, as well as the tool bars slidable therein, are substantially identical, only one pair need be described.

A lower spacing member 9 is supported between a pair of plates 8, upon top surface 2, and is secured in position by studs 12 having nuts 13, and a key 182 fitting matched depressions in surface 2 and member 9. An intermediate spacing member 10 is secured between plates 8, in spaced relation to member 9 so that the lower flat surface thereof defines, with the adjacent side walls of plates 8 and the upper surface of member 9, a guideway 7, which may be rectangular in cross section. A second guideway 7a is formed between each pair of plates 8, by the upper surface of member 10, and gibs 14 fixed to the lower surface of spacing member 11 are adjustable to precisely vary the height of guideways 7 and 7a and to make sure that the tool slides are held together firmly with just enough freedom to have a nice sliding fit in their guideways. Hardened steel wear plates 9a, 10a, 14a, are secured to the respective members 9, 10, and 14 at the areas of contact with tool carriers or slides 65 and 71.

The pairs of slides 65 and 71 are thus mounted for sliding within guideways 7 and 7a in a direction normal to the work axis. As shown in Figures VIII and VIIIa, slide 65 has a forward portion 65a and a rearward portion 65b, slidably fitting guideway 7a, and is cut away between said portions. At its forward end slide 65 has a tool block 66 rigidly fixed thereto as by key 68 and screws 69. Tools 67 are adjustably fixed in holder 66. At its other end, slide 65 carries a rack 70 which may be integral with the slide or rigidly fixed thereto.

Tool slide 71 has portions 71a and 71b slidably fitting guideway 7 and is cut away between said portions. Referring more particularly to Figures IX and X, it will be noted that base 1 has slide blocks 77 fixed to its forward upper surface by screws 78. These blocks are shaped in cross section as shown at Figure IX, and each has a central groove within which a block 82 is fixed by screws 83. Block 77 has integral upwardly-extending side rails 79 to the tops of which gibs 80 are fixed, as by screws 81, to form guideways for pairs of guide rails 85 fixed to the forwardly-extending portion 72 of slide 71, by means of screws 86. In this manner, slide 71 is firmly supported at its forward end and is guided for precise reciprocation in a direction parallel to slide 65. At its forward end 72, slide 71 has adjustably fixed thereto, a block member 73 to which a tool block 74 is fixed by means of screws 76. These screws pass through openings in block 74 that are enlarged to permit limited adjustment of block 74 with respect to member 73 whereby the tools 75 on block 74 may be adjusted into the proper relation to tools 67 on block 66. It will be noted from Figures VIII and VIIIa, that the cutting edges of tools 67 and 75 lie substantially in the horizontal plane through the work axis and have their cutting edges reversed. In this manner, the tools are simultaneously fed into the work from opposite sides thereof and the lateral forces between the respective tools and work are opposed and tend to cancel one another. Thus, resultant forces tending to deflect the work piece from its axis of rotation, are kept small and a high degree of precision in the finished piece is assured. Also to be noted is the fact that block 77 supports its tools at a point close to the vertical through the point of contact between tools and work whereby all tendency to chatter is eliminated. Each of the portions 65a, 65b, 71a, and 71b are faced with hardened steel bearing surfaces or plates. A rack 70a is rigidly attached to the rear portion of slide 71 in a position opposite to, and facing rack 70 upon slide 65, and by reference to Figure VII it will be noted that each rack 70, 70a, lies in a channel in its respective slide and is secured therewithin by screws 70b.

While only one pair of slides and their supports have been described, it will be understood that a number of such pairs may be used in a single lathe; and as shown more particularly at Figure IX, we employ two pairs in the machine selected for illustration, each located between headstock 5 and a respective tailstock 3.

An upright hydraulic cylinder 87 is fixed by screws 88 to the rear upper edges of two adjacent frames 8, and has a piston 89 connected to reciprocate a rod 90. A rack 93, Figures VII and IIa, is attached to the lower end of rod 90. Said rack is T-shaped in cross-section and is guided for vertical reciprocation by a bracket 91 fixed to top surface 2 by screws 92. Gibs 95 are fixed to bracket 91 by screws 96 and slidably engage and guide the projecting portions of the rack. This rack at its lower end projects into a cored pocket in base I where, in its limited downward position it engages a stop screw 104 threaded into an aperture in a thickened portion 106 of base I and secured in adjusted position by a lock nut 105. This construction enables the stroke of the rack to be adjusted and, as will be apparent from subsequent description, makes it possible to precisely adjust the maximum depth of cut of all cutting tools. Connections 160, Figure II, are provided to admit and exhaust fluid under pressure to and from cylinder 87, at opposite sides of piston 89.

Referring more particularly to Figures VII and IIa, the rear upright edges of plates or frames 8, have projections 8a having bearing caps 99 secured thereto by screws 100. These projections are recessed to form with the caps, line bearing supports for a shaft 98. This shaft has a segmental gear 97 keyed thereto in position to mesh with, and be turned by rack 93 as the latter is reciprocated. Shaft 98 extends along the back of the lathe, as shown at Figure VII, and has keyed thereon pinions 101 and 102, each meshing with a respective pair of racks 70, 70a previously described. Thus, as pressure fluid is admitted to cylinder 87, rod 90 and rack 93 are driven to rotate shaft 98 and pinions 101 and 102 and thus impart equal and opposite reciprocation to tool slides 65 and 71 and associated tools 67 and 75 relative to the plane 103 passing through the work axis of the lathe.

From the foregoing description, it will be clear that we have provided a lathe that is well-adapted for automatic and rapid finishing of articles such as crankshafts. All cuts are made in one pass of the cutting tools, and all tools operate simultaneously upon the article being turned. As each pair of tools acts at the same time upon substantially diametrically opposite portions of the work piece, the external forces that would otherwise tend to distort the work piece from its true axis of rotation tend to annul each other whereby all surfaces, particularly the line bearings, are completed with a high degree of accuracy.

At the moment that the tools have substantially completed the line bearing surfaces, their feeding movement is positively stopped.

While, for the purpose of complying with the patent statutes, we have selected and described a machine adapted for a particular job, it will be understood that the invention is not so limited, but that numerous other types of work may be turned in the lathe and correctly handled by various contours and adjustments of the cams. Furthermore, numerous modifications and substitutions will occur to those skilled in this art. It is our intention to reserve all such modifications and substitutions as fall within the scope of the subjoined claim.

Having now fully described our invention, what we claim is:

In a machine of the character described, a frame having means defining a work axis of rotation, a tool carrier guided by said frame for reciprocation toward and from said axis, a rack on said carrier, a shaft journaled on said frame, a pinion on said shaft meshing with said rack, a gear on said shaft, a power cylinder on said frame, a piston reciprocable in said cylinder, a rod fixed to said piston and having a rack on its end meshing with said gear, guide means for said rack, and a stop pin threaded into said frame and positioned to be engaged by said rack to positively limit movement of said carrier toward said axis.

WILLIAM F. GROENE.
HAROLD J. SIEKMANN.
WALTER R. MEYER.

REFERENCES CITED

The following references are of record in the file of this patent:

UNITED STATES PATENTS

| Number | Name | Date |
| --- | --- | --- |
| 568,063 | Bogert | Sept. 22, 1896 |
| 1,843,359 | Groene | Feb. 2, 1932 |
| 2,069,107 | Groene et al. | Jan. 26, 1937 |
| 2,141,466 | Groene | Dec. 27, 1938 |
| 2,148,293 | Groene | Feb. 21, 1939 |
| 2,238,019 | Floeter | Apr. 8, 1941 |
| 2,250,640 | LeBlond | July 29, 1941 |
| 2,299,976 | Groene | Oct. 27, 1942 |
| 2,351,263 | Harrington | June 13, 1944 |